United States Patent [19]

McWethy

[11] 4,248,450
[45] Feb. 3, 1981

[54] VEHICLE TOWING HITCH HAVING READILY SELECTABLE TOW BALLS

[76] Inventor: Wesley I. McWethy, 1719 Catalpa Ave., Waukegan, Ill. 60085

[21] Appl. No.: 17,429

[22] Filed: Mar. 5, 1979

[51] Int. Cl.³ .............................................. B62D 53/00
[52] U.S. Cl. .................................. 280/415 A; 280/495
[58] Field of Search ............ 280/415 R, 415 A, 415 B, 280/491 A, 490 R, 495, 498, 504, 511; 248/207, 558, 222.1; 403/4, 52, 83, 84, 87, 103, 91, 93, 92, 96

[56] References Cited

U.S. PATENT DOCUMENTS

| | | | |
|---|---|---|---|
| 2,827,307 | 3/1958 | Osborn | 280/417 |
| 2,911,233 | 11/1959 | Riddle | 280/415 A |
| 3,801,134 | 4/1974 | Dees | 280/415 A |
| 3,922,006 | 11/1975 | Borges | 280/415 A |

Primary Examiner—John J. Love
Assistant Examiner—Randall A. Schrecengost
Attorney, Agent, or Firm—Gildo E. Fato

[57] ABSTRACT

Described is a vehicle towing hitch designed for permanent installation on the towing vehicle and having a plurality of readily selectable tow balls. The hitch allows the user the ability to select one of any standard tow ball size by simply removing an index pin, rotating the desired tow ball to the upper vertical position, and reinstalling the index pin. In a heavy duty embodiment, a tongue which may be incorporated including a tow pin for receiving the tongue of a towed vehicle such as a trailer as well as an additional large tow ball size.

2 Claims, 5 Drawing Figures

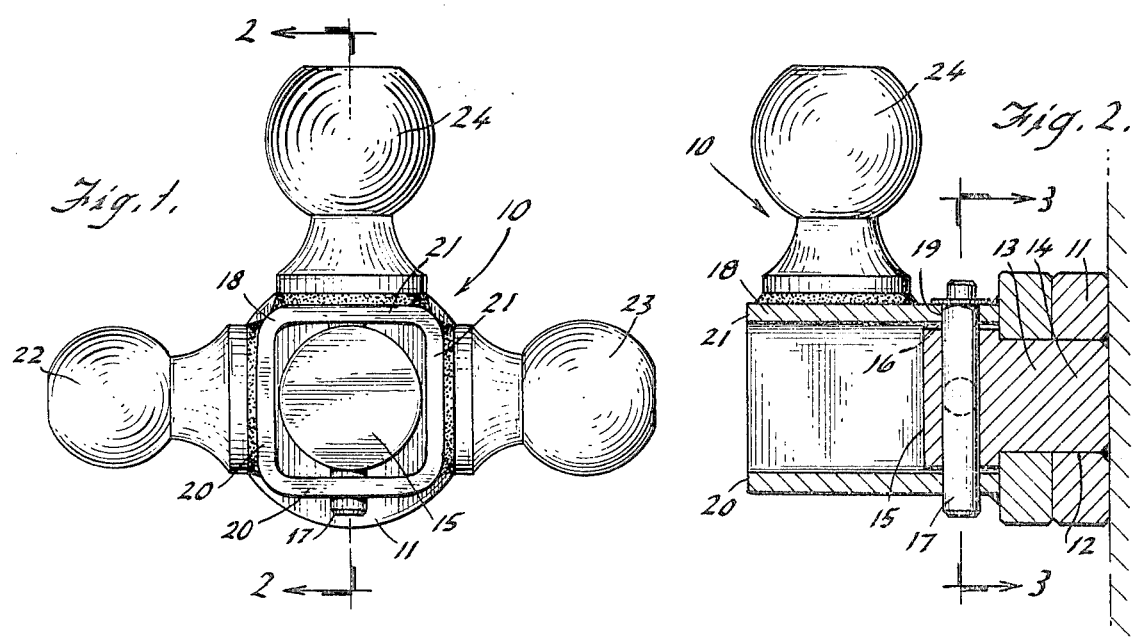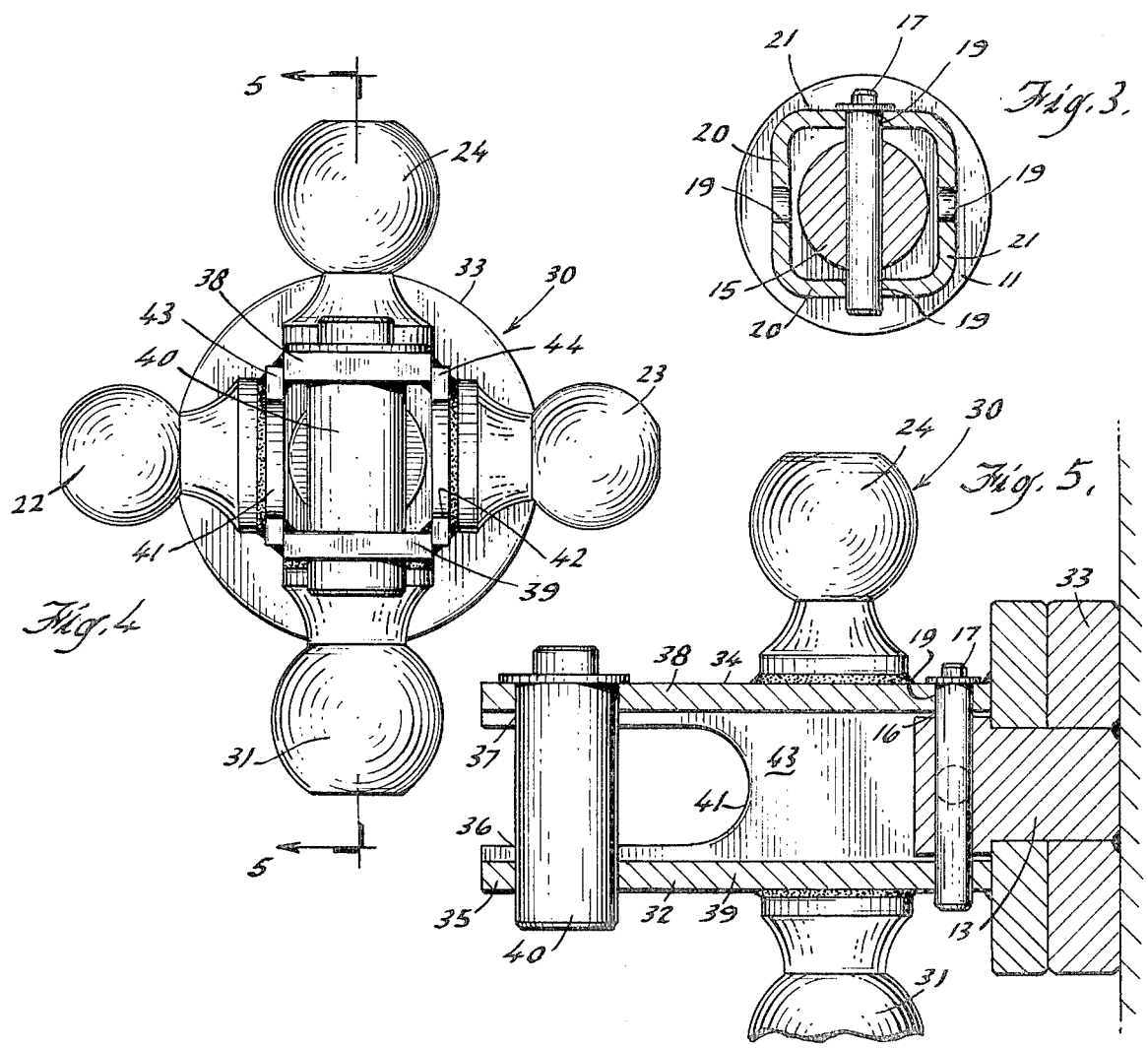

VEHICLE TOWING HITCH HAVING READILY SELECTABLE TOW BALLS

BACKGROUND OF THE INVENTION

A common means of towing a vehicle such as a utility trailer, camping trailer, and the like is by means of a tow ball hitch. In a typical arrangement, the hitch is permanently attached to the towing vehicle and is adapted to tow a specific towed vehicle such as a camping trailer, and includes a tow ball of a size adapted to mate with the corresponding member on the trailer for receiving the towing ball. With such a hitch, if it is desired to tow a trailer of a different size, it is necessary to manually remove the tow ball and install a tow ball of a size to mate with the second trailer. Hence, if it is desired to tow a number of different vehicles, the conventional towing hitch is not convenient and requires the cumbersome and time consuming operation of manually removing and replacing the tow ball. A number of towing hitches have been described which include multiple tow balls adapted to tow different size vehicles such as described in U.S. Pat. No. 3,801,134, issued Apr. 2, 1974 and 3,922,006, issued Nov. 25, 1975. Such units however are somewhat complex and include a considerable number of parts.

SUMMARY OF THE INVENTION

Described is a towing hitch including a plurality of tow balls and which is simple in construction and operation and is economical to produce. The hitch is permanently installed on the towing vehicle in a conventional manner and allows the user to select any standard tow ball size by simply removing an index pin, rotating the desired tow ball to the upper verticle position, and then re-installing the index pin. In a hitch embodiment designed for heavy duty use, a large diameter size tow ball and tongue hitch can be included.

DRAWINGS

The invention can be readily understood by referring to the following description and accompanying drawings wherein:

FIG. 1 is a front elevation of one embodiment of the hitch assembly illustrating the multiple tow ball arrangement;

FIG. 2 is a side view partially in cross-section of the hitch assembly of FIG. 1;

FIG. 3 is a cross-sectional view taken along the line 3—3 of FIG. 2 and illustrating the arrangement of the main pin, index pin and body of the hitch assembly;

FIG. 4 is a front elevational view of another embodiment of the hitch assembly of this invention; and FIG. 5 is a side elevational view, partially in cross-section taken along the line 5—5 of FIG. 4.

DETAILED DESCRIPTION

Referring to the drawings, FIGS. 1 and 2 illustrate an embodiment of the invention intended for lighter duty such as for use with a typical automobile. The towing hitch 10 of this embodiment comprises a mounting plate 11 which can be mounted to the vehicle a number of different ways using a plate adapter (not shown) and having circular opening 12 therein for receiving the main pin 13. The main pin 13 is of circular cross-section and is securely fitted within the opening 12 in the mounting plate 11 such as by welding or by a thread arrangement. The main pin 13 comprises two portions 14 and 15 which are concentric the portion 14 having a diameter co-extensive with the diameter of the opening 12 of the mounting plate 11 into which it fits, the other portion 15 being of a larger diameter and having a passageway 16 axially through the center thereof for receiving an index pin 17. The tubular body portion 18 of the hitch assembly 10 is preferably of generally square configuration as best illustrated in FIG. 3 and has openings 19 in opposing walls 20, 21 thereof for receiving the index pin 17. Affixed to the body portion 18 are a plurality of tow balls 22, 23, 24 of varying sizes for receiving the corresponding hitch (not shown) of the towed vehicle, the tow balls 22, 23, 24 being fastened to the body 18 by welding, for example. As illustrated in FIG. 3 the width of the body 18 is slightly greater than the diameter of the main pin 13 to permit the body 18 to be rotated about the main pin 13.

As best illustrated in FIG. 2, the mounting plate 11 is fastened by conventional means to the towing vehicle, the mounting plate 11 fitting over the main pin 13 and being retained thereon by the index pin 17. In use, the index pin 17 is removed the body portion 18 rotated until the desired tow ball 22, 23, 24 is in the upward verticle position and the index pin 17 is then replaced. Thus, the tow ball 24 of the required size to fit the corresponding hitch (not shown) on the towed vehicle is in position for use.

FIGS. 4 and 5 illustrate a towing hitch 30 designed for heavy duty use such as on trucks, tractors and other heavier vehicles and in comparison to the embodiment illustrated in FIGS. 1 and 2, includes a tow ball 31 of larger diameter than any of the three tow balls 22, 23, 24 in the embodiment of FIGS. 1 and 2 as well as an extended body portion 32 for use with a towed vehicle which has a tongue rather than a cup for receiving a tow ball. As best illustrated in FIG. 5, the embodiment is essentially the same as that illustrated in FIGS. 1 and 2 but includes a larger mounting plate 33 and a body 34 which is extended in length. The end 35 of the body distal from the mounting plate 33 includes openings 36, 37 in two of the opposed walls 38, 39 for receiving a tow pin 40 and slots 41, 42 in the remaining two opposed walls 43, 44 to facilitate receiving the tongue (not shown) of the trailer or towed vehicle. The heavy duty embodiment 30 illustrated in FIGS. 4 and 5 is used in the same manner as the towing hitch 10 of FIGS. 1 and 2. As previously described, the index pin 17 is removed, the body 34 rotated about the main pin 13 until the desired tow ball 24 is facing upwardly in the verticle position and the index pin 17 is then re-inserted through the openings 19 in the body 34 and main pin 13. Thus, the tow ball 24 of desired size is in position for receiving the corresponding hitch of the towed vehicle. In the event the towed vehicle, such as a utility trailer, does not have a hitch for receiving a tow ball but instead has a tongue type hitch, the towing hitch is positioned so that the tow pin 40 is facing in a verticle position. The tow pin 40 is removed, the tongue (not shown) of the towed vehicle is inserted within the body 34 of the towing hitch, within the slots 41, 42 the opening in the tongue (not shown) aligned with the openings 36, 37 in the body 34 of the hitch 30 and the tow pin 40 is then inserted through the openings 36, 37 in the body 34 and the tongue to thereby retain the tongue of the towed vehicle within the hitch 30.

As can be seen, the towing hitch of the present invention is simple in construction and operation, can be economically manufactured and at the same time permits towing of different sized vehicles without the necessity of changing towing ball or hitch on the towing vehicle.

What is claimed is:

1. A towing hitch having a plurality of readily selectable tow balls, said towing hitch comprising:

a mounting plate adapted for mounting on a towing vehicle, said mounting plate having a circular opening therein in a generally horizontal position when the mounting plate is mounted on the towing vehicle, a solid main pin of circular cross-section and having two adjacent concentric portions, the first portion having a diameter co-extensive with the diameter of the opening in the mounting plate and securely fitted therein, the second portion having a diameter greater than the diameter of the first portion and having a passageway therethrough along the axis thereof, a tubular body of generally square cross-section and having opposed walls, said body being adapted for rotation about the first portion of the main pin and being in abutting relationship between the mounting plate and the second portion, opposing walls of said body having aligned openings therein, a plurality of tow balls of different size fixedly mounted on the walls of said body, and an index pin removably insertable through the aligned openings in the opposing walls of the body and the passageway in the second portion of the main pin whereby the body of the towing hitch can be rotated about the main pin to select a tow ball of the desired size and said index pin inserted through said aligned openings and passageway to retain said body and tow ball in a fixed position.

2. The towing hitch of claim 1 wherein the body thereof is of extended length, the end of the body distal from the mounting plate including aligned openings in opposed walls thereof and slots in the remaining opposed walls whereby the tongue of the hitch of a towed vehicle can be inserted therein, and a tow pin removably insertable within the aligned openings to thereby retain said tongue within the towing hitch.

* * * * *